United States Patent [19]

Mattus et al.

[11] Patent Number: 4,828,761

[45] Date of Patent: May 9, 1989

[54] PROCESS FOR IMPREGNATING A CONCRETE OR CEMENT BODY WITH A POLYMERIC MATERIAL

[75] Inventors: Alfred J. Mattus, Kingston; Roger D. Spence, Clinton, both of Tenn.

[73] Assignee: The United States of America as represented by the United States Department of Energy, Washington, D.C.

[21] Appl. No.: 188,325

[22] Filed: May 4, 1988

[51] Int. Cl.⁴ .................. G21F 9/16; C04B 24/34; C04B 7/02

[52] U.S. Cl. .................................... 252/628; 106/90; 106/94; 106/236; 106/239; 252/633; 523/129; 523/207; 523/211; 523/375

[58] Field of Search .................. 252/628, 633; 106/89, 106/90, 94, 100, 85, 97, 104, 218, 236, 239; 526/347.2; 523/129, 207, 211, 216, 375

[56] References Cited

U.S. PATENT DOCUMENTS 4,174,293 11/1979 Columbo et al. ............. 253/628
4,222,889 9/1980 Uerpmann .................... 252/628

FOREIGN PATENT DOCUMENTS 2741661 3/1979 Fed. Rep. of Germany .
0126298 7/1984 Japan ................... 252/628
8517802 9/1987 Japan .
938211 10/1963 United Kingdom ........ 252/628
1596783 8/1981 United Kingdom ........ 252/628
2107917 5/1983 United Kingdom ........ 252/628
0000047 1/1980 World Int. Prop. O. ..... 252/628

Primary Examiner—Howard J. Locker
Attorney, Agent, or Firm—Stephen D. Hamel; Judson R. Hightower

[57] ABSTRACT

A process for impregnating cementitious solids with polymeric materials by blending polymeric materials in a grout, allowing the grout to cure, and contacting the resulting solidified grout containing the polymeric materials with an organic mixture containing a monomer, a cross-linking agent and a catalyst. The mixture dissolves the polymerized particles and forms a channel for distributing the monomer throughout the network formed by the polymeric particles. The organic components are then cured to form a substantially water-impermeable mass.

20 Claims, 1 Drawing Sheet

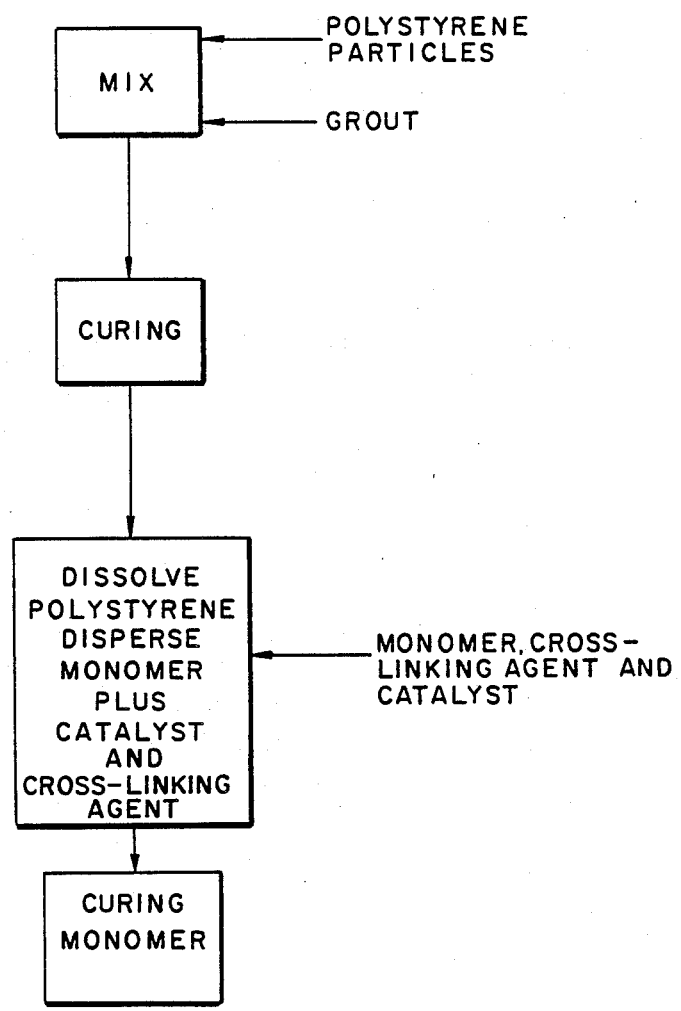

PROCESS FOR IMPREGNATING A CONCRETE OR CEMENT BODY WITH A POLYMERIC MATERIAL

The Government has rights in this invention pursuant to Contract No. DE-AC05-840R21400, awarded by the U.S. Department of Energy.

This invention relates to methods for forming substantially liquid-impermeable solid bodies and more particularly to cementitious solids which are treated to be substantially impermeable to aqueous liquids.

BACKGROUND OF THE INVENTION

It has been a goal in the building and waste disposal industries to make concrete or cement bodies relatively impermeable to water. The building industry is concerned because water which penetrates concrete can, as a result of alternate freezing and thawing, cause surface layers of the concrete to spall, or, in extreme cases, cause the concrete body to break into smaller pieces.

One method of disposing of wastes, especially radioactive aqueous wastes, contemplates using an aqueous waste solution to provide the water of hydration in forming a concrete or grout mass. However, unless precautions are taken, the resulting body may be sufficiently permeable to water so that radioactive components can be leached from the solidified mass.

Attempts have been made in the prior art to impregnate concrete with polymers to form a relatively impermeable mass. However, the permeation of organic-based polymers even a few inches into such a material has met with only limited success due to the low permeability of the concrete mass and the presence therein of water and air which impedes the movement of low density, hydrophobic liquids. In some instances, nearly complete drying of the concrete mass is necessary to remove the water in order to obtain even limited penetration. In some cases, vacuum has been used to remove entrained air from a solid, and in others high pressure has been used to force a polymer into a solid. Attempts at mixing a polymer with grout prior to solidification has, in some instances, interferred with the hydration of the cement which is necessary to form the solid, or has resulted in the separation of phases because of density differences. The usefulness of these processes is, in general, limited to small-scale, relatively thin material that could be expected to be completely impregnated by these techniques.

SUMMARY OF THE INVENTION

It is accordingly one object of this invention to provide a process for making cementitious bodies that are substantially impervious to penetration by water.

It is another object of this invention to provide a process for incorporating substantially water insoluble polymeric materials within a solid cementitious body.

In accordance with the invention, there is provided a method of making a substantially liquid-impermeable cementitious solid comprising the steps of mixing a cement-containing grout with a dispersion of particles which are insoluble in water but soluble in an organic liquid, and then curing the grout. The resulting cured body is brought into contact with a solvent for the dispersed particles. The solvent, which is a mixture of a polymerizable monomer and a polymerizing catalyst, dissolves at least a portion of the dispersed organic-soluble particles and is thus distributed throughout the solid mass and subsequently cured to form a substantially liquid impermeable body. By the use of this process, substantially complete impregnation of a large solidified mass with a monomer can be achieved in a relatively short time such as, for example, several hours. The process has the further advantage that it can be carried out without either first evacuating the solid to remove air and water or applying pressure to move the permeating monomer into the solid. No special equipment is required to carry out the process since the monomer can permeate the solid mass merely by adding it to a top surface.

This invention is not only useful for disposing of hazardous waste, as for example, toxic and nuclear wastes, but can be used to increase the durability of concrete which is subject to freezing and thawing conditions or corrosive environments.

BRIEF DESCRIPTION OF THE FIGURES

The Figure is a block diagram showing the sequence of steps for carrying out the present process.

DETAILED DESCRIPTION OF THE INVENTION

In the first step of carrying out the invention, a grout is formed by mixing a cement with an aqueous component. The cement can be any cementitious material such as, for example, Portland Cement, and the aqueous component for supplying the water of hydration may consist essentially of water or, when the process is used for disposing of hazardous wastes, may contain those waste materials. In the preferred method of carrying out this invention, the grout will contain water in amounts conventionally used in the industry to form fluid grouts for waste disposal (high water/cement ratio) and to form concrete bodies for construction (low water/cement ratio).

The grout which is formed is mixed with a mass of solids which have the property of being substantially insoluble in water, and readily soluble in a liquid organic monomer.

While the invention contemplates the use of non-polymeric materials as the dispersed solids, in the preferred method of carrying out the invention, polymeric solids are used and the invention will be illustrated in more detail by describing a process in which polystyrene is the dispersed organic component.

The polystyrene may be used in the form of a powder, or beads or elongated pieces, such as fibers, ribbons or tubular elements. While the use of elongated elements may provide some advantages over the use of particles, such as, for example, serving in the nature of reinforcing elements, in general it is preferred to use polystyrene in the form of a powder or beads. The size of the particles is not critical, and particles having a diameter of less than about 1 mm may be used. However, particles having a diameter in the range from about 1 to 2 mm are preferred since they are easy to prepare and handle.

The polystyrene particles are preferably provided in a concentration which forms a substantially continuous network throughout the mass of grout. However, it has been surprisingly discovered that the particles need not be in a concentration sufficient so that they touch each other and in the subsequent step, the monomer is able to penetrate in the absence of a continuous phase of polystyrene. A concentration as low as 1 to about 3% by volume of polystyrene may be used and a concentration of 5% has given excellent results. The polystyrene is preferably in a concentration less than about 30%, although it may be present in a concentration as high as about 50%, and may in some instances exceed 50%. However, a high volume of polystyrene will result in a low strength cement when there is not a sufficient concentration of cement particles to provide a coherent body.

While substantially solid polystyrene particles may be used, in the preferred method of carrying out the invention, the polystyrene is in the form of foam particles which typically have a density of from about 0.02 to about 0.03 grams per ml. The foam particles have adequate strength to withstand collapse under the weight of the grout, and are more readily soluble by the monomer in the subsequent step than are dense particles, probably as a result of the low mass per unit volume to be dissolved.

The resulting mixture of grout and polystyrene particles is solidified by curing the grout. The resulting cured body is then contacted with a polystyrene solvent comprising liquid styrene monomer and a catalyst for polymerizing the styrene. In a preferred embodiment, a cross-linking agent such as divinyl benzene is added, which will result in a very tough final polystyrene which is insoluble in many organic solvents. The solvent disperses throughout the solid mass as it dissolves the polystyrene particles. The polystyrene network thus acts as a conduit to carry the monomer-catalyst mixture to all parts of the solid grout. The liquid mixture then diffuses outwardly into the areas surrounding the channels created from the dissolved polystyrene.

The styrene, divinyl benzene, dissolved polystyrene and catalyst are then cured to form, in combination with the cured grout, an impermeable solid composite. The curing may be accomplished by raising the solid mass to a temperature high enough to cure, or polymerization can be effected by subjecting it to an ionizing radiation or merely by the passage of time.

Having thus described the invention, the following example is offered to illustrate it in more detail.

EXAMPLE

Liquid waste containing approximately 25 weight percent sodium nitrate, together with other trace metals was added to a dry cement aggregate mixture in a ratio of about 1 gallon of liquid waste per 14 pounds of dry solids. Foam polystyrene having a density of about 0.02 grams per cc. was reduced in size to an average particle diameter of about 1 mm and the resulting polystyrene particles were added to the grout in a ratio by volume of 5 parts polystyrene to 95 parts grout. The resulting thick slurry, which was viscous enough to prevent the polystyrene particles from floating or segregating, was poured into a mold and permitted to harden and cure.

Liquid styrene monomer containing benzoyl peroxide in a concentration of between 2 and 5 weight percent based on the weight of the monomer and about 5 to 30% divinyl benzene (preferably about 10%) was poured on top of the solidified grout. The monomer dissolved the polystyrene which was dispersed throughout the grout and permeated the solid mass. The container was then placed inside an oven at a temperature between 50° and 80° C. for approximately 16 hours, thereby polymerizing the styrene monomer into a hard, glass-like polymer.

Destructive analysis of the solidified, impregnated waste grout bodies showed them to be entirely permeated with the hardened polystyrene, including all outer surfaces. A visible light microscope showed that the inner surfaces were completely covered with a shiny glass-like polymer, and scanning electromicroscopy confirmed this observation. The protective nature of the polymer was tested by placing pieces of randomly broken polymer-impregnated grout, together with solidified polymer-free grout, in concentrated hydrochloric acid. The pieces which were impregnated with the polymer remained intact for several weeks without any effects; however, the polymer-free grout fell apart in a few hours and partially dissolved.

This invention has been illustrated and exemplified by the use of polystyrene as the polymer and liquid styrene as the monomer. However, other polymers and monomers may be used, the only requirement being that the polymer be soluble in the monomer in order to open channels to the inside of the solidified grout. The monomer must not only be capable of dissolving the polymer, but must have a low enough viscosity to permeate the solidified mass. Other combinations of polymer and monomers and combinations of monomers with compatible solvents and/or cross-linking agents which may be used in this invention will become obvious to workers in the art. This invention should be limited only in accordance with the following claims.

What is claimed is:

1. A method of making a cementitious solid body which is resistant to penetration by water comprising:
   (a) forming a curable viscous slurry by mixing together organic-soluble solids which are substantially insoluble in water and a grout comprising a powdered cement and an aqueous component;
   (b) solidifying said slurry by curing said grout, thereby forming a solid mass containing a dispersion of organic-soluble solids;
   (c) contacting the resulting cured body with an organic solvent for said organic-soluble solids, said solvent comprising a polymerizable monomer and a polymerizing catalyst for said monomer, whereby said solvent dissolves at least a portion of the dispersed organic-soluble solids, and is distributed within said solid mass; and
   (d) curing the polymerizable monomer to form a solid body resistant to penetration by water.

2. The method of claim 1 wherein said aqueous component contains waste materials.

3. The method of claim 2 wherein said waste materials comprise radioactive components.

4. The method of claim 1 wherein said organic-soluble solids are present in a concentration by volume of from about 2 to about 50 percent of the mixture formed in step (a).

5. The method of claim 4 wherein said organic-soluble solids are present in a concentration by volume from about 5 percent to about 30 percent.

6. The method of claim 1 wherein said organic-soluble solids are particulates having an average particle diameter from about 1 mm to about 2 mm.

7. The method of claim 1 wherein said organic-soluble solids have an elongated shape, and a minimum dimension of about 1 mm.

8. The method of claim 1 wherein said organic-soluble solids comprise polystyrene and said monomer comprises styrene.

9. The method of claim 1 wherein said organic-soluble solids comprise foamed polymeric particles.

10. The method of claim 1 wherein said organic-soluble solids comprise polymeric particles having a density from about 0.02 gm/cc to about 0.03 gm/cc.

11. The method of claim 1 wherein in step (d) said polymerizable monomer is cured by heating to a temperature from about 50° to about 80° C.

12. The method of claim 1 wherein in step (d) said polymerizable monomer is cured by ionizing radiation.

13. The method of claim 1 wherein in step (c) said organic solvent includes a cross-linking agent.

14. The method of claim 13 wherein said aqueous component contains waste materials.

15. The method of claim 13 wherein said organic-soluble solids are present in a concentration by volume of from about 2 to about 50 percent of the mixture formed in step (a).

16. The method of claim 13 wherein said organic-soluble solids are particulates having an average particle diameter from about 1 mm to about 2 mm.

17. The method of claim 13 wherein said organic-soluble solids comprise foamed polymeric particles.

18. The method of claim 13 wherein in step (d) said polymerizable monomer is cured by heating to a temperature from about 50° to about 80° C.

19. The method of claim 13 wherein in step (d) said polymerizable monomer is cured by ionizing radiation.

20. The method of claim 1 wherein said organic soluble solids comprise polystyrene, and said organic solvent comprises styrene, a polymerizable catalyst for said styrene, and divinyl benzene as a cross-linking agent.

* * * * *